United States Patent [19]

Rahm

[11] Patent Number: 5,797,462

[45] Date of Patent: Aug. 25, 1998

[54] PNEUMATIC POWER TOOL

[75] Inventor: Erik Roland Rahm, Väsby, Sweden

[73] Assignee: Atlas Copco Tools AB, Nacka, Sweden

[21] Appl. No.: 656,213

[22] PCT Filed: Oct. 9, 1995

[86] PCT No.: PCT/SE95/01154

§ 371 Date: Jun. 10, 1996

§ 102(e) Date: Jun. 10, 1996

[87] PCT Pub. No.: WO96/11090

PCT Pub. Date: Apr. 18, 1996

[30] Foreign Application Priority Data

Oct. 10, 1994 [SE] Sweden .................... 9403425

[51] Int. Cl.$^6$ .................... B23B 45/04; F16K 11/14
[52] U.S. Cl. .................... 173/169
[58] Field of Search .................... 173/168, 169, 173/170; 251/39; 137/637.2; 91/31, 461

[56] References Cited

U.S. PATENT DOCUMENTS

| | | |
|---|---|---|
| 3,326,240 | 6/1967 | McConnaughay . |
| 4,024,892 | 5/1977 | Prisco et al. . |
| 4,258,799 | 3/1981 | Eckman . |
| 4,476,942 | 10/1984 | Elkin . |
| 5,228,523 | 7/1993 | Rahm ............................ 173/169 |
| 5,303,781 | 4/1994 | Lin . |
| 5,377,769 | 1/1995 | Hasuo et al. ............................ 173/169 |

FOREIGN PATENT DOCUMENTS 2098528  11/1982  United Kingdom .

*Primary Examiner*—Scott A. Smith
*Attorney, Agent, or Firm*—Frishauf, Holtz, Goodman, Langer & Chick

[57] ABSTRACT

A pneumatic power tool comprises a housing (10) with a pistol type handle (11), a motor located in the housing (10), a pressure air inlet passage (13) and an exhaust air passage (14) both extending through the handle (11) in substantially parallel with each other, and a manually operable throttle valve assembly (12) having two in sequence activatable valve elements (51, 53) for smooth starting and slow running of the motor, and a rotatable sleeve (40) for shifting between two positions corresponding to "forward" and "reverse" operation of the tool, respectively.

4 Claims, 3 Drawing Sheets

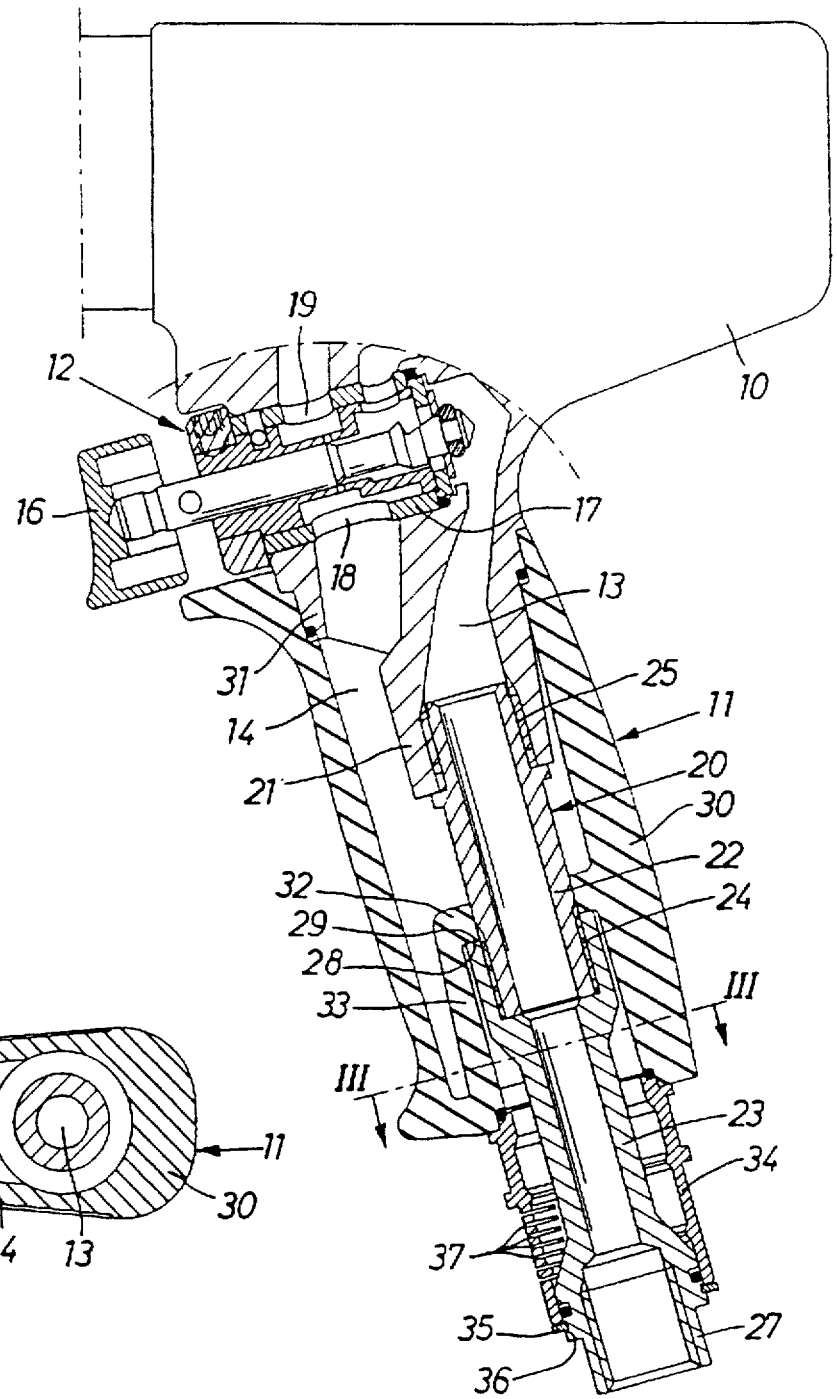
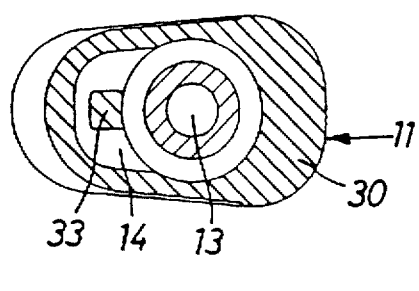

PNEUMATIC POWER TOOL

BACKGROUND OF THE INVENTION

This invention relates to a pneumatic power tool of the type having a housing with a pistol type handle, a motor in the housing, a pressure air inlet passage and an exhaust air passage extending substantially in parallel to each other through the handle, and a manually operable throttle valve located in the air inlet passage.

In this type of power tool, as for example the tool disclosed in GB 2 098 528, there is incorporated a throttle valve of the type having a longitudinally displaceable valve stem with a push button for manual operation at its outer end and a valve head at its inner end. The inner end portion of the valve stem extends through an air inlet opening, and a seat surrounding the air inlet opening is arranged to be sealingly engaged by the valve head on the valve stem.

This common type of throttle valve is disadvantageous for two reasons, namely that it requires a relatively high activation force to be opened and does not make possible a smooth start and slow running of the tool.

A previous throttle valve design providing a smooth two-step start and slow running of the tool is described in U.S. Pat. No. 4,258,799. This known throttle valve, however, is disadvantageous in that it is bulky and does not enable integration of a forward/reverse valve function.

SUMMARY OF THE INVENTION

It is an object of the invention to provide a pneumatic power tool including a throttle valve which has a smooth two-step opening function and a very compact design, and which suitably incorporates a reverse valve function.

Another object of the invention is to provide a power tool throttle valve with smooth starting and slow running properties and which in a compact design suitably integrates a forward/reverse function.

A preferred embodiment of the invention is described below with reference to the accompanying drawings.

BRIEF DESCRIPTION OF THE DRAWINGS

FIG. 2. shows, on a larger scale, a fraction of the power tool in FIG. 1.

FIG. 3 shows a cross section along line III—III in FIG. 2.

DETAILED DESCRIPTION

Figure 1:
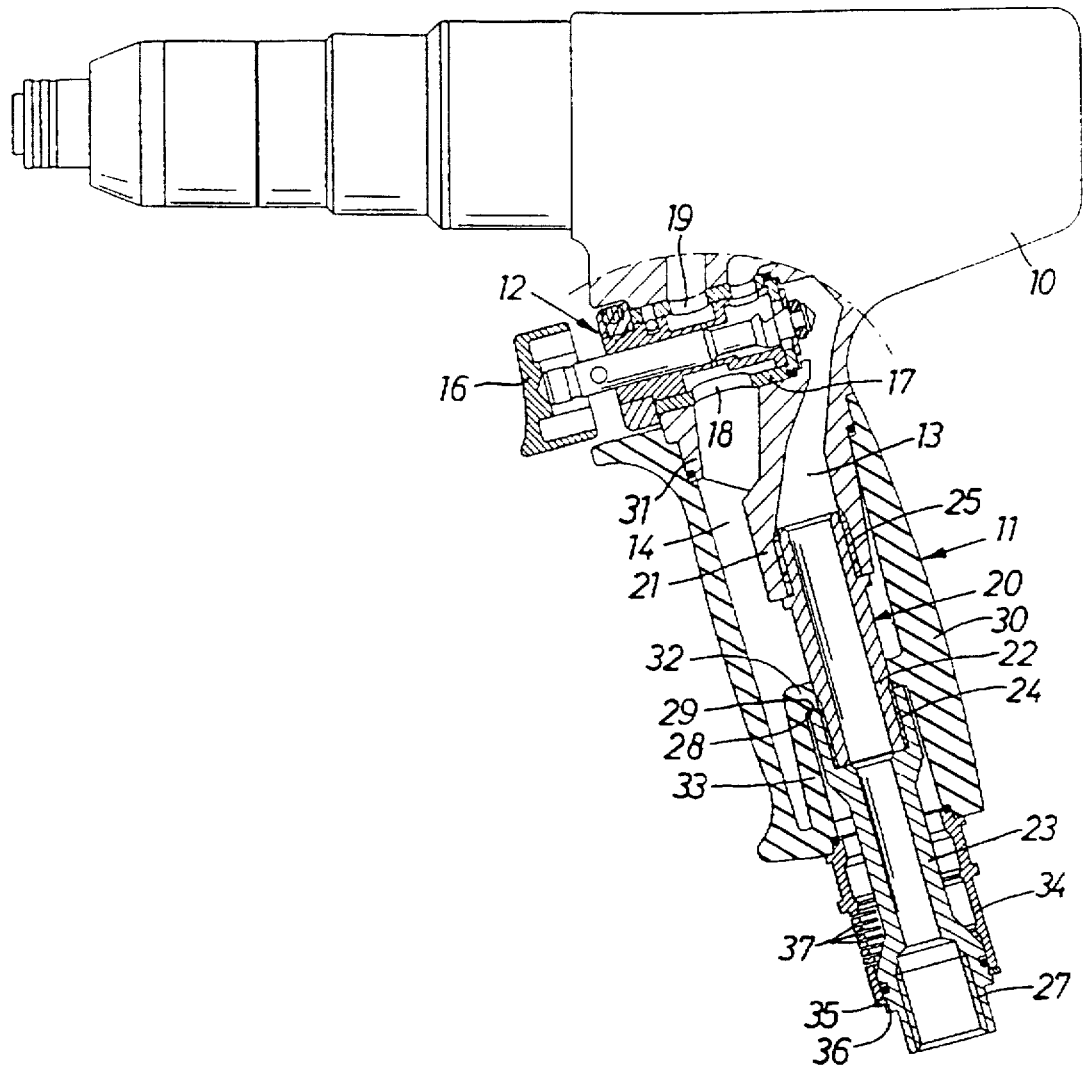
FIG. 1 shows a side view, partly in section, of a power tool according to the invention.

The power tool shown on the drawings comprises a housing 10 with a pistol type handle 11 and a throttle valve assembly 12. Within the housing there is located a pneumatic motor (not shown) which is supplied with motive pressure air through an inlet passage 13 and which exhausts air though an exhaust passage 14. The inlet and exhaust passages 13, 14 extend substantially in parallel to each other through the handle 11.

The throttle valve assembly 12, which is manually operable by a push button 16, forms a part of the inlet passage 13. The throttle valve assembly 12 also traverses the exhaust passage 14 and comprises an outer sleeve 17 with two lateral openings 18, 19 which for part of the exhaust passage 14. The throttle valve assembly 12 will be described further detail below.

The handle 11 comprises a central tubular stem 20 which forms a part of the inlet passage 13 and which is formed by a protrusion 21 from the housing 10 and two tube sections 22, 23 interconnected by a thread joint 24 and secured to the housing protrusion 21 by means of another thread connection 25. The outer tube section 23 is formed with a threaded socket 27 for connection of a pressure air supply conduit.

The inner end of the outer tube section 23 forms an annular shoulder 28 which engages an oppositely facing shoulder 29 on a hallow grip element 30 to firmly secure the latter to the tool housing 10. The grip element 30, which is supported on a neck portion 31 on the housing 10, surrounds the tubular stem 20 and defines together with the latter a part of the exhaust passage 14. The shoulder 29 is formed by an inner ring portion 32 of the grip element 30 and is supported on one side by a stay member 33.

A tubular outlet diffusor 34 is supported coaxially around the outer tube section 23 and is axially locked by a lock ring 35 mounted in a circumferential groove 36 in the socket 27 However, the diffusor 33, which on one side is formed with a number of outlet slots 37, is rotatable to enable a change of outlet flow direction.

The grip element 30, which is easily detachable from the tool housing 10 after removal of the outer tube section 23, is molded in a heat insulating resinous material in order to protect the operator from the cold of the exhaust air.

The grip element 30 may also be exchangeable for alternatively shaped grip elements for adaptation of the grip size and shape to different operator's needs. In other words, the grip element 30 is one of two or more interchangeable grip elements providing different sizes and shapes of the handle grip.

The throttle valve assembly 12 incorporates a reverse function and comprises an inner sleeve 40 which is rotatably supported in the outer sleeve 17, previously described, for shifting between two alternative positions for "forwards" and "reverse" tool operation, respectively. For that purpose, the outer sleeve 17 has two angularly spaced air feed openings 41a, b (one only is illustrated) which communicate with two air feed passages 42a,b in the housing 10, and the inner sleeve 40 which is provided with one lateral air distribution opening 43. The latter is movable into alternative alignment with the air feed openings 41a,b by angular displacement of the inner sleeve 40. A maneuver ring 44 is attached to the outer end of the sleeve 40 for enabling shifting of the sleeve 40 between the "forward" and "reverse" positions, and a transverse lock pin 38 forms an axial lock for the two sleeves 17, 40 while allowing a limited rotation of the inner sleeve 40.

At its inner end, the outer sleeve 17 is closed by an end wall in the form of an annular disc 45. The latter is clamped between the sleeve 17 and a shoulder 46 in the air inlet passage 13 and defines a central air inlet opening 47. A valve stem 48, which at its outer end carries the push button 16, extends through a guide bore 49 in the inner sleeve 40 for longitudinal displacement. The inner sleeve 40 also has a waist portion 39 forming a flow passage between the exhaust passage openings 18, 19 in the outer sleeve 17.

Figure 4:
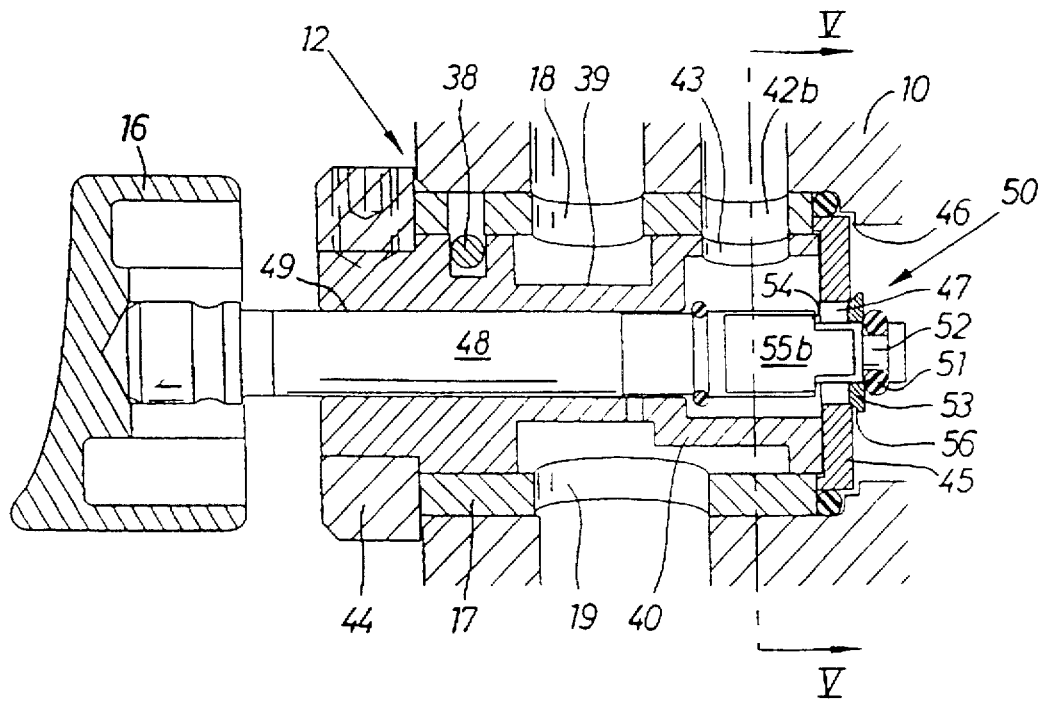
FIG. 4 shows a longitudinal section through a throttle valve according to the invention.
Figure 5:
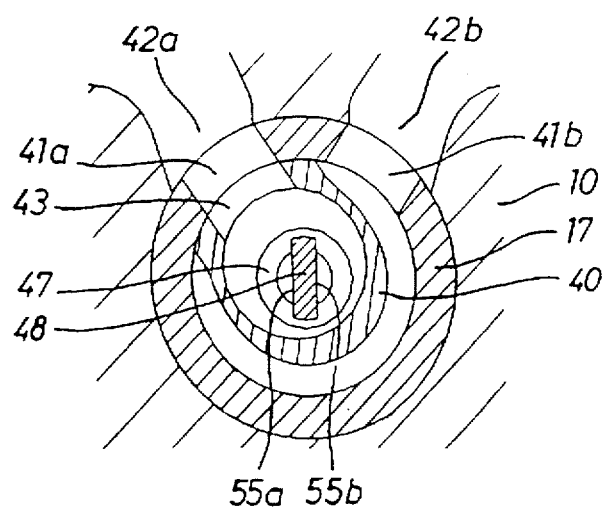
FIG. 5 shows a cross section along line V—V in FIG. 4.

At its inner end, as shown in FIG. 4, the valve stem 48 carries a valve unit 50 which is arranged to cooperate with the air inlet opening 47. The valve unit 50 comprises a first valve element in the form of an O-ring 51 supported in a circumferential groove 52 in the valve stem 48, a second valve element in the form of a non-resilient washer 53 movably supported on the valve stem 48, and a shoulder 54 on the valve stem 48 for cooperation with the washer 53. The shoulder 54 is located at a distance from the groove 52 and is intended to engage the washer 53 after a certain displacement of the valve stem 48 in the opening direction. The valve stem 48 also comprises two opposite flat portions 55a,b forming air passages through the washer 53 and the air inlet opening 47 as the valve is opened.

The O-ring 51 is arranged to sealingly cooperate with the washer 53, whereas the washer 53 is arranged to cooperate with air inlet opening 47 in the end wall 45. In order to obtain a well defined and very narrow contact surface between the washer 53 and the air inlet opening 47, the washer 53 is formed with a bevelled surface 56 so as to engage the edge only of the air inlet opening 47.

In operation, the throttle valve assembly 12 is maintained in a closed condition by the air pressure and is opened by maneuvering of the push button 16. In the closed condition, the O-ring 51 cooperates sealingly with the washer 53, and the washer 53 is kept in a sealing contact with the edge of the air inlet opening 47.

When starting pressing the push button 16, the O-ring 51 is lifted off the washer 53 and lets a small flow of pressure air through the washer 53 via the flat portions 55a, b. Since the area sealed off by the O-ring 51 is relatively small, the activation force to start opening the valve is very small.

After a certain distance of further displacement of the valve stem 48, the shoulder 54 engages the washer 53 and starts lifting the latter off the air inlet opening edge. Thereby, a larger area is opened up and an increased air flow is accomplished through the air inlet opening 47. A full air flow through the throttle valve is obtained as the washer 53 is lifted a certain distance from the air inlet opening edge, thereby allowing pressure air to flow both through the central aperture of the washer 53 and through the air inlet opening 47.

By the above described valve concept there is obtained a throttle valve combining a smooth, two-step activation, a low activation force, and a very compact design.

I claim:

1. A pneumatic power tool, comprising:
   a housing having a pneumatic motor therein;
   a pressure air inlet passage in said housing;
   an air inlet opening adapted to be in fluid communication with said air inlet passage and defining an edge shaped valve seat; and
   a manually operable throttle valve assembly which is shiftable between a closed condition and an open condition, said throttle valve assembly including:
      a longitudinally displaceable valve stem having an outer end which carries a push button and an inner end which extends through said air inlet opening; and
      a valve unit for controlling the air flow through said air inlet opening;
   said valve unit including:
      a shoulder on said valve stem;
      a first valve element rigidly attached to said valve stem at a distance from said shoulder; and
      a second valve element displaceably guided on said valve stem between said shoulder and said first valve element, said second valve element including a non-resilient annular washer having a beveled contact surface for sealing cooperation with said edge shaped
   valve seat which is defined by said inlet opening; and said valve stem is formed with a passage extending axially through said second valve element and past said shoulder;
   wherein, when said throttle valve assembly is in said closed condition, said first valve element is arranged to cooperate sealingly with said second valve element, and said second valve element is arranged to cooperate sealingly with said edge shaped valve seat defined by said air inlet opening.

2. A pneumatic power tool according to claim 1, wherein said passage comprises at least one external flat portion on said valve stem.

3. A pneumatic power tool according to claim 1, wherein said first valve element comprises an O-ring mounted in a peripheral groove in said valve stem.

4. A pneumatic power tool according to claim 1, wherein:
   said throttle valve assembly comprises a tubular sleeve rigidly secured in said housing in a coaxial disposition relative to said valve stem;
   said sleeve has an outer end and an inner end corresponding to said outer end and said inner end, respectively, of said valve stem; and
   said inner end of said sleeve is closed by an annular disc defining said inlet opening.

\* \* \* \* \*